United States Patent
Noguchi et al.

(10) Patent No.: US 10,030,150 B2
(45) Date of Patent: Jul. 24, 2018

(54) FINE MAGNESIUM OXIDE PARTICLE DISPERSION LIQUID AND METHOD FOR PRODUCING SAME

(71) Applicant: Ube Materials Industries, Ltd., Ube-shi, Yamaguchi (JP)

(72) Inventors: Seiji Noguchi, Ube (JP); Yuzo Kato, Ube (JP); Masayuki Fujimoto, Ube (JP)

(73) Assignee: UBE MATERIAL INDUSTRIES, LTD., Ube-shi, Yamaguchi (JP)

( * ) Notice: Subject to any disclaimer, the term of this patent is extended or adjusted under 35 U.S.C. 154(b) by 0 days.

(21) Appl. No.: 15/128,178

(22) PCT Filed: Mar. 23, 2015

(86) PCT No.: PCT/JP2015/058661
§ 371 (c)(1),
(2) Date: Sep. 22, 2016

(87) PCT Pub. No.: WO2015/146875
PCT Pub. Date: Oct. 1, 2015

(65) Prior Publication Data
US 2017/0096562 A1 Apr. 6, 2017

(30) Foreign Application Priority Data
Mar. 24, 2014 (JP) ................. 2014-060149

(51) Int. Cl.
C09D 1/00 (2006.01)
C01F 5/02 (2006.01)
C09C 1/02 (2006.01)

(52) U.S. Cl.
CPC ................ *C09D 1/00* (2013.01); *C01F 5/02* (2013.01); *C09C 1/028* (2013.01); *C01P 2004/51* (2013.01); *C01P 2004/62* (2013.01); *C01P 2004/64* (2013.01); *C01P 2006/60* (2013.01)

(58) Field of Classification Search
CPC ............. C09C 1/028; C09D 1/00; C01F 5/02
See application file for complete search history.

(56) References Cited

FOREIGN PATENT DOCUMENTS

| JP | 2005-220264 A | 8/2005 |
|---|---|---|
| JP | 2006-224784 A | 8/2006 |
| JP | 2006-225240 A | 8/2006 |
| JP | 2007-137695 A | 6/2007 |
| JP | 2011-148668 A | 8/2011 |

OTHER PUBLICATIONS

Machine translation of JP2007-137695A, publication date , Jun. 7, 2007.*
Machine translation of JP2011-148668, publication date , Aug. 4, 2011.*
International Search Report dated Jun. 2, 2015, issued in counterpart International Application No. PCT/JP2015/058661 (2 pages).

* cited by examiner

*Primary Examiner* — Jun Li
(74) *Attorney, Agent, or Firm* — Westerman, Hattori, Daniels & Adrian, LLP

(57) ABSTRACT

A fine magnesium oxide particle dispersion liquid containing an aprotic solvent, and fine magnesium oxide particles that are dispersed in the aprotic solvent, wherein the dispersion liquid has $D_{50}$ of 200 nm or less in a particle size distribution as measured by a dynamic light scattering method, and has a content rate of coarse particles having an average particle diameter of 500 nm or more of less than 1%, and a method for producing the fine magnesium oxide particle dispersion liquid.

15 Claims, No Drawings

FINE MAGNESIUM OXIDE PARTICLE DISPERSION LIQUID AND METHOD FOR PRODUCING SAME

TECHNICAL FIELD

The present invention relates to a fine magnesium oxide particle dispersion liquid and a method for producing the fine magnesium oxide particle dispersion liquid. More specifically, the present invention relates to a fine magnesium oxide particle dispersion liquid having high transparency, which contains an aprotic solvent and fine magnesium oxide particles that are dispersed in the aprotic solvent, and a method for producing the fine magnesium oxide particle dispersion liquid.

BACKGROUND ART

Magnesium oxide films are utilized as dielectric protective layers for AC type PDPs (altered current type plasma display panels), insulating films for MRAMs (magnetic resistance memories) and TMR elements (tunnel magnetic resistance elements), moisture adsorbing layers for organic EL elements and barrier films, and the like.

These magnesium oxide films are generally produced by deposition processes such as an electron beam deposition process, a spatter process and a CVD process. However, the deposition processes require vacuum apparatuses such as a vacuum chamber and a vacuum pump, and thus the production equipment becomes large. Therefore, a method including applying a dispersion liquid of fine magnesium oxide particles by an application process and drying the dispersion liquid has been investigated in recent years, and it is already known that an alcohol dispersion liquid of fine magnesium oxide particles is preferable for the application process and is advantageous for producing a thin film since any vacuum apparatus is not required and the film formation velocity is fast.

As the alcohol dispersion liquid of fine magnesium oxide particles, for example, Patent Literature 1 describes a fine magnesium oxide particle dispersion liquid containing a monovalent alcohol having 3 to 5 carbon atoms, and fine magnesium oxide particles that are dispersed in the range of from 0.05 to 20% by mass in the monovalent alcohol, wherein the particle dispersion liquid has $D_{50}$ of the fine magnesium oxide particles measured by a dynamic light scattering method in the range of from 5 to 100 nm. Furthermore, Patent Literature 2 describes that the fine magnesium oxide particle dispersion liquid described in Patent Literature 1 is preferably used for forming a dielectric protective layer for an AC type PDP. These documents describe that, as a method for producing a fine magnesium oxide particle dispersion liquid, fine magnesium oxide particles having an average primary particle diameter within the range of from 5 to 100 nm and a monovalent alcohol having 3 to 5 carbon atoms are mixed, and the mixture (a dispersion liquid) is then subjected to a dispersion treatment by a pulverizing apparatus using beads having an average particle diameter of from 20 to 300 μm.

Furthermore, for example, Patent Literature 3 describes a fine magnesium oxide particle dispersion liquid containing a polar organic solvent, and fine magnesium oxide particles that are dispersed in an amount in the range of from 0.05 to 20% by mass with respect to the total amount of the dispersion liquid, wherein the particle dispersion liquid has $D_{50}$ of the fine magnesium oxide particles measured by a dynamic light scattering method in the range of from 5 to 20 nm, and $D_{10}/D_{90}$ of 0.3 or more. This document describes, as a method for producing the fine magnesium oxide particle dispersion liquid, a method including a step of preparing a dispersion liquid by dispersing a magnesium oxide powder formed of fine magnesium oxide particles having an average primary particle diameter in the range of from 5 to 20 nm in a polar organic solvent to thereby prepare a dispersion liquid, and a step of forming a dispersion liquid of fine particles by applying a pressure to the dispersion liquid to thereby cause a dispersion liquid jet flow, then branching the dispersion liquid jet flow into two or more dispersion liquid jet flows, and allowing the respective dispersion liquid jet flows to collide under opposing to thereby break the magnesium oxide powder in the dispersion liquid to give a dispersion liquid of fine particles. Furthermore, specifically, a dispersion liquid in which a magnesium oxide powder had been put into butyl alcohol was produced in Examples.

In addition, Patent Literature 4 describes a metal oxide particle dispersion liquid containing: metal oxide particles having, in a particle diameter measurement by a dynamic light scattering method, an average particle diameter $D_{50}$ in the range of from 15 nm or more and 40 nm or less, and $D_{95}$ of 100 nm or less, and a coefficient of variation (CV value) of particle diameters in the range of 30% or more and 60% or less; a dispersant; and a dispersion medium, and the metal oxide particle dispersion liquid was produced in Examples by adding titania particles to a dispersion medium containing a dispersant and a dispersant aid under stirring with a homogenizer to give a slurry, and finally treating with zirconia beads.

CITATION LIST

Patent Literature

Patent Literature 1: JP 2006-225240 A
Patent Literature 2: JP 2006-224784 A
Patent Literature 3: JP 2007-137695 A
Patent Literature 4: JP 2011-148668 A

SUMMARY OF INVENTION

Technical Problem

However, the dispersion liquids described in Patent Literatures 1 to 3 are dispersion liquids in which fine magnesium oxide particles are dispersed in a protic solvent, and thus have a problem that they cannot be used in applications other than the application process, for kneading with a resin or the like. Therefore, a dispersion liquid using an aprotic solvent, which has high affinity with resins, is required. However, there is a problem that the compatibility of magnesium oxide on a hydrophilic surface and an aprotic solvent is very poor, and thus dispersion does not occur at all by only mixing, and it is difficult to obtain a sufficiently dispersed dispersion liquid having a high transmittance even if a dispersant is used.

Furthermore, Patent Literature 4 describes oxide particles of aluminum, zinc, germanium, indium, tin, antimony, cerium, titanium and zirconium as metal oxides, and does not disclose at all that magnesium oxide is sufficiently dispersed in an aprotic solvent.

The present invention was made in view of the above-mentioned problems, and aims at providing a fine magnesium oxide particle dispersion liquid that sufficiently disperses and has a high transmittance even in the case when an aprotic solvent is used, and a method for producing the fine magnesium oxide particle dispersion liquid.

Solution to Problems

The present inventors did intensive studies so as to achieve the above-mentioned purpose, and consequently found that a fine magnesium oxide particle dispersion liquid that is sufficiently dispersed and having a high transmittance can be obtained when a dispersion liquid containing coarse particles is firstly obtained by mixing fine magnesium oxide particles, an aprotic solvent and a dispersant, and subjecting the mixture to a dispersion treatment, and the passing the dispersion liquid containing coarse particles through a packed layer in which beads are packed, and achieved the present invention.

That is, the present invention relates to a fine magnesium oxide particle dispersion liquid including an aprotic solvent, and fine magnesium oxide particles that are dispersed in the aprotic solvent, the dispersion liquid having $D_{50}$ of 200 nm or less in a particle size distribution as measured by a dynamic light scattering method, and having a content rate of coarse particles having an average particle diameter of 500 nm or more of less than 1%.

Further, the present invention relates to a method for producing a fine magnesium oxide particle dispersion liquid, including: a dispersion step, in which fine magnesium oxide particles and a dispersant are dispersed in an aprotic solvent to give a dispersion liquid containing coarse particles, and a filtration step, in which the dispersion liquid containing coarse particles is passed through a packed layer in which beads are packed.

Advantageous Effects of Invention

As mentioned above, according to the present invention, even in the case when an aprotic solvent is used, a fine magnesium oxide particle dispersion liquid that is sufficiently dispersed and has a high transmittance, and a method for producing the fine magnesium oxide particle dispersion liquid can be provided.

DESCRIPTION OF EMBODIMENTS (Fine Magnesium Oxide Particle Dispersion Liquid)

The fine magnesium oxide particle dispersion liquid of the present invention has $D_{50}$ of 200 nm or less in a particle size distribution as measured by a dynamic light scattering method, and has a content rate of coarse particles having an average particle diameter of 500 nm or more of less than 1%. In the present invention, a particle size distribution on light intensity basis measured by a dynamic light scattering method is used, and the particle size distribution on light intensity basis is suitable for the evaluation of a content of particles having an average particle diameter of 100 nm or more, since the existence of particles having larger particle diameters is accentuated as compared to a particle size distribution on volume basis.

The fine magnesium oxide particle dispersion liquid of the present invention has $D_{50}$ of 200 nm or less in a particle size distribution as measured by a dynamic light scattering method, and 5 to 100 nm is preferable, and 10 to 60 nm is more preferable. When $D_{50}$ is more than 200 nm, it is not preferable since the transmittance decreases and the haze increases. Furthermore, in the particle size distribution as measured by a dynamic light scattering method, $D_{95}$ is preferably from 10 to 200 nm, more preferably from 20 to 150 nm, specifically preferably from 20 to 100 nm.

Furthermore, the content rate of the coarse particles having an average particle diameter of 500 nm or more is less than 1%, preferably 0.8% or less, more preferably 0.5% or less, with respect to the whole fine magnesium oxide particles in the dispersion liquid. When the coarse particles having an average particle diameter of 500 nm or more is contained by 1% or more, it is not preferable since the transmittance decreases and the haze increases. Furthermore, the content rate of the particles having an average particle diameter of 200 nm or more is less than 1%, preferably 0.8% or less, more preferably 0.5% or less with respect to the whole fine magnesium oxide particles in the dispersion liquid.

Furthermore, the fine magnesium oxide particle dispersion liquid of the present invention has a transmittance of preferably 70% or more, more preferably 75% or more. The transmittance of the dispersion liquid is an index of dispersibility, and in the present invention, when the transmittance is 70% or more, it can be said that the fine magnesium oxide particles are finely dispersed. Incidentally, in the present invention, the transmittance of the dispersion liquid refers to the transmittance at a wavelength of 600 nm of a 10% by mass magnesium oxide dispersion liquid measured by the method of Examples mentioned below.

The concentration of the fine magnesium oxide particles in the fine magnesium oxide particle dispersion liquid of the present invention is preferably from 0.1 to 40% by mass, more preferably from 1 to 30% by mass.

(Method for Producing Fine Magnesium Oxide Particle Dispersion Liquid)

The fine magnesium oxide particle dispersion liquid of the present invention can be produced by a dispersion step in which a dispersion liquid containing coarse particles is obtained by dispersing fine magnesium oxide particles and a dispersant in an aprotic solvent, and a filtration step in which the dispersion liquid containing coarse particles is passed through a packed layer in which beads are packed.

(Dispersion Step)

In the present invention, the dispersion liquid containing coarse particles can be produced by, for example, a method in which fine magnesium oxide particles, a dispersant and an aprotic solvent are mixed, and flocculates of the fine magnesium oxide particles in the obtained dispersion liquid are pulverized or crushed by a wet pulverizing apparatus. As the wet pulverizing apparatus, known apparatuses that have been conventionally utilized for the production of fine particle dispersion liquids such as a pulverizing apparatus and a wet jet mill using beads can be used. As the wet jet mill, an apparatus that applies a pressure to a dispersion liquid to cause a dispersion liquid jet flow, then branches the dispersion liquid jet flow into two or more dispersion liquid jet flows, and allows the respective dispersion liquid jet flows to collide under opposing to thereby pulverize or crush flocculates of the fine particles in the dispersion liquid (for example, a nanomizer) can be used. Furthermore, as the pulverizing apparatus using beads, a rocking mill can be preferably used. In the rocking mill, it is preferable that the packing amount of the beads in the pot volume is set to from 10 to 90%, more preferably from 30 to 80%, the rotation number is set to from 50 to 1,000 rpm, and the treatment time is set to from about 5 minutes to 50 hours.

The material of the beads is preferably made of glass or made of zirconia that is worn little, due to small contamination. The size of the beads can be suitably selected depending on the particle size of the magnesium oxide fine powder, and generally, 0.01 to 1 mm is preferably used.

As the aprotic solvent used in the present invention, aromatic hydrocarbon-based solvents such as toluene and xylene, hydrocarbon-based solvents such as hexane and cyclohexane, halogenated hydrocarbon-based solvents such as dichloromethane and chloroform, ether-based solvents such as dibutyl ether, ketone-based solvents such as 2-butanone, ester-based solvents such as butyl acetate, and the like can be exemplified. One kind of these aprotic solvents may be singly used, or two or more kinds may be used in combination. Furthermore, among these, the hydrocarbon-based solvents, aromatic hydrocarbon-based solvents and halogenated hydrocarbon-based solvents are specifically preferable in view of the transmittance when a dispersion liquid is formed.

In the fine magnesium oxide particle dispersion liquid of the present invention, the addition amount of the fine magnesium oxide particles is preferably from 0.1 to 40% by mass, more preferably from 1 to 30% by mass with respect to the entirety of the dispersion liquid. As the magnesium oxide fine powder used as a raw material, magnesium oxide fine powders produced by a vapor phase process, and magnesium oxide fine powders produced by thermal decomposition of magnesium salts such as magnesium carbonate, magnesium hydroxide, magnesium nitrate and magnesium chloride can be exemplified.

The magnesium oxide fine powder produced by a vapor phase process is generally fine particles containing cubic-shaped primary particles and having a high purity of 99.98% by mass or more. The vapor phase process is a method for obtaining a magnesium oxide fine powder by oxidizing metal magnesium vapor by bringing the metal magnesium vapor into contact with oxygen. In the magnesium oxide fine powder obtained by this vapor phase process, the average particle diameter can be set to be within 5 to 200 nm by controlling the growth velocity of crystalline nuclei. In the present invention, the average particle diameter of the fine magnesium oxide particles used as the raw material is preferably from 5 to 50 nm.

Furthermore, the fine magnesium oxide particle powder may be subjected to a heating treatment before being mixed with the aprotic solvent so as to remove adhered water. The temperature for the heating treatment is generally in the range of from 100 to 300° C.

In the fine magnesium oxide particle dispersion liquid of the present invention, it is preferable to use an anionic surfactant or a nonionic surfactant as the dispersant. Examples of the anionic surfactant include a phosphate ester type, a carboxylic acid type, an aliphatic acid, a sulfate ester type, a sulfonic acid type and the like. Furthermore, examples of the nonionic surfactant include a sorbitan ester type, a polyether amine type and the like. For example, "Monogen" series, "Hitenol" series, "Plysurf" series, "Neogen" series, "Neocol" series, "Noigen" series and "Sorgen" series (these are manufactured by DKS Co., Ltd.), "Beaulight" series and "Ionet" series (these are manufactured by Sanyo Chemical Industries, Ltd.), "Nonion" series and "Nymeen" series (these are manufactured by NOF Corporation), and the like are preferably used. As the dispersant, those having a low HLB, specifically 10 or less, are preferable, and those having an HLB of from 1 to 8 are more preferable. The addition amount of the dispersant is preferably from 0.01 to 40% by mass, more preferably from 0.1 to 30% by mass with respect to the entirety of the dispersion liquid.

According to the dispersion step of the present invention, for example, a magnesium oxide particle dispersion liquid containing coarse particles having an average particle diameter of 500 nm or more at a content of 1% or more in a particle size distribution as measured by a dynamic light scattering method, that is, a dispersion liquid containing much coarse particles, can be obtained.

(Filtration Step)

The fine magnesium oxide particle dispersion liquid of the present invention can be produced by subjecting the dispersion liquid containing coarse particles obtained by the above-mentioned dispersion step to a step of passing the dispersion liquid through a packed layer in which beads are packed (a filtration step). It is difficult to remove the coarse particles having an average particle diameter of 500 nm or more to less than 1% from the dispersion liquid by only pulverizing or crushing the flocculates of the fine magnesium oxide particles in the dispersion liquid by using a wet pulverizing apparatus. Therefore, in the production method of the present invention, an operation to remove the coarse particles by passing the magnesium oxide particle dispersion liquid containing much coarse particles through the packed layer in which beads are packed is utilized.

The shape of the beads used in the packed layer in the filtration step is preferably spherical. The material for the beads is preferably an inorganic substance such as glass or zirconia. The average particle diameter of the beads is generally from 0.01 to 1 mm, preferably from 0.01 to 0.5 mm. Furthermore, in the case when a pulverizing apparatus using beads is used in the dispersion step, it is preferable to use beads having the same shape and made of the same material as those of the beads in the dispersion step for the beads in the filtration step, in view of operation efficiency. Furthermore, it is preferable that the packed layer of the beads is such that ten or more layers of beads are stacked. That is, the thickness of the packed layer is preferably a length of 10 or more times, specifically preferably in the range of from 20 to 20,000 times, of the average particle diameter of the beads. Furthermore, in order to increase the passage velocity of the packed layer of the magnesium oxide particle dispersion liquid, the magnesium oxide particle dispersion liquid may be put into a pressurized state and passed through the packed layer.

The packed layer in which beads are packed is preferable in that clogging is difficult to occur unlike filtration using a general filter. Therefore, the packed layer is specifically suitable for the filtration of nano-level fine particles as in the present invention.

For example, the filtration step of the present invention is conducted as follows.

Firstly, a magnesium oxide particle dispersion liquid and beads are put into a cylindrical container having a lid on the upper part and an outlet on the lower part. The beads then settle out in the magnesium oxide particle dispersion liquid, and the beads accumulated on the lower part of the container, whereby a beads-packed layer is formed. The lid on the upper part of the container is then fixed to thereby put the inside of the container into a sealed state, and the inside of the container is pressurized by introducing a gas into the container from a gas introduction tube, which has been disposed on the lid and the like in advance. Examples of the gas introduced in the contained may include, air, oxygen, nitrogen and argon, and the like. Furthermore, the pressure applied to the inside of the container is preferably from 0.01 to 0.50 MPa. Due to the formation of the beads-packed layer by the accumulation of the beads on the lower part of the container, coarse particles are captured by many gaps that have been formed among the beads during the passage of the magnesium oxide particle dispersion liquid through the beads-packed layer, whereby the content of the coarse particles in the magnesium oxide particle dispersion liquid decreases. Thereafter, the fine magnesium oxide particle dispersion liquid in which the content of the coarse particles has been decreased is removed from the outlet at the lower part of the container and collected, whereby the fine magnesium oxide particle dispersion liquid of the present invention can be obtained.

In the fine magnesium oxide particle dispersion liquid that has undergone the above-mentioned filtration step, the concentration of the dispersion liquid changes little before and after the filtration. As mentioned above, coarse particles are accentuated and detected in the particle size distribution on light intensity basis used in the present invention. Therefore, even the coarse particles were detected by a particle size distribution on light intensity basis, the actual coarse particles have such a concentration that it cannot be detected by a particle size distribution on volume basis, and thus the concentration is not changed after undergoing the filtration step. Therefore, the filtration step of the present invention is a step for further decreasing the content of coarse particles that cannot be detected by a particle size distribution on volume basis, and a dispersion liquid having a high transmittance and fine dispersibility can be obtained while maintaining the original performances of the dispersion liquid, by undergoing the filtration step of the present invention.
(Magnesium Oxide Film)

The fine magnesium oxide particle dispersion liquid of the present invention, which has a small content of the coarse particles, can be advantageously used as a raw material for producing a magnesium oxide film by an application process. That is, a magnesium oxide film can be produced by applying the fine magnesium oxide particle dispersion liquid on a substrate, and drying the dispersion liquid. As the method for applying the fine magnesium oxide particle dispersion liquid on the substrate, a spin coat process, a dipping process, a spray process, a bar coat process, a roll coat process, a curtain coat process, a gravure print process, a silk screen process and an inkjet process can be used. The film thickness of the magnesium oxide film is generally from 10 nm to 1,000 μm.

Furthermore, the fine magnesium oxide particle dispersion liquid of the present invention uses an aprotic solvent, which has a high affinity to resins. Therefore, besides the above-mentioned application processes, a magnesium oxide-containing resin composition film can be preferably produced by kneading with a resin, for example, polymethyl methacrylate, polystyrene, vinyl polymers such as polyvinyl chloride and copolymers thereof, polycarbonates, polyesters, polysulfones, phenoxy resins, epoxy resins and silicone resins. The film thickness of the magnesium oxide-containing resin composition film is generally from 0.1 μm to 100,000 μm.

The magnesium oxide film produced by using the fine magnesium oxide particle dispersion liquid of the present invention is a film-like aggregate of the fine magnesium oxide particles. Therefore, the crystal structure of the magnesium oxide film is identical with that of the fine magnesium oxide particles as a raw material, and in an X-ray diffraction pattern of the magnesium oxide film obtained by an X-ray diffraction process, the peak intensity of the X-ray diffraction ray attributed to the (200) plane of magnesium oxide is higher than the peak intensity of the X-ray diffraction ray attributed to the (111) plane of magnesium oxide. On the other hand, in general, the peak intensity of the X-ray diffraction ray attributed to the (111) plane of magnesium oxide is higher than the peak intensity of the X-ray diffraction ray attributed to the (200) plane of magnesium oxide in a magnesium oxide film formed by a deposition process. It is considered that a magnesium oxide in which the peak intensity of the X-ray diffraction ray attributed to the (200) plane is high is generally difficult to be hydrated, i.e., has higher hydration resistance, as compared to a magnesium oxide in which the peak intensity of the X-ray diffraction ray attributed to the (111) plane is high. Therefore, a magnesium oxide film produced by using the fine magnesium oxide particle dispersion liquid of the present invention has higher hydration resistance than that of a magnesium oxide film formed by a deposition process.

Furthermore, a magnesium oxide film and a magnesium oxide-containing resin composition film produced by using the fine magnesium oxide particle dispersion liquid of the present invention are excellent in light permeability, spatter resistance and insulating property. These magnesium oxide film and magnesium oxide-containing resin composition film can be preferably utilized as dielectric protective layers for AC type PDPs, insulating films for MRAM or TMR elements, or moisture adsorbing layers for organic EL elements or barrier films.

EXAMPLES

The present invention will be specifically explained below based on Examples, but these examples do not limit the purpose of the present invention. Firstly, the methods for measuring the physical properties of the obtained fine magnesium oxide particle dispersion liquids will be indicated below.

[Method for Measuring Particle Size Distribution]

The solvent used in each sample was added to the fine magnesium oxide particle dispersion liquid as a sample to thereby dilute the sample so that the concentration of the fine magnesium oxide particles became 0.2% by mass, and a dispersing treatment was conducted by an ultrasonic homogenizer (SONIFIER 150: Branson Ultrasonics, manufactured by Emerson Japan, Ltd.) under a condition of a power strength of 4 for 1 minutes. The particle size distribution on light intensity basis of the fine magnesium oxide particles in the obtained dilution dispersion liquid was measured by using a dynamic light scattering particle size distribution measurement apparatus (Nanotrack UPA-EX150, manufactured by Nikkiso Co., Ltd.). The particle size distribution was measured five times, for 60 seconds for each measurement, and the particle size distribution on light intensity basis was calculated from the average value thereof. From the calculated particle size distribution on light intensity basis, $D_{50}$, $D_{95}$, and the content rate of coarse particles having particle diameters of 500 nm or more were obtained. The "undetected" in the table represents the detection limit or less of the measurement apparatus (less than 0.01%).

[Method for Measuring Transmittance]

Using a quartz cell with an optical path length of 10 mm, the transmittance was measured by a spectrometer (V-670, manufactured by JASCO Corporation). Only a solvent was put into the cell, a base line was measured, the sample was then put into the cell, and the transmittance at a wavelength of 600 nm was measured.

Example 1

30 g of a fine magnesium oxide powder (BET specific surface area: 170 m²/g, average particle diameter: 10 nm), 258 g of toluene, 12 g of a dispersant (a surfactant, Plysurf A208F: manufactured by DKS Co., Ltd.) and 1.2 kg of spherical beads made of zirconia (YTZ ball, diameter: 0.1 mm: manufactured by Nikkato Co., Ltd.) were put into a container having a volume of 1 L, and the container was closed with a lid. The container closed with the lid was then shaken at 520 rpm for 3 hours by using a rocking mill to thereby prepare a magnesium oxide particle dispersion liquid. The magnesium oxide particle dispersion liquid in the container was collected by decantation.

160 g of the collected magnesium oxide particle dispersion liquid was passed under pressurization at 0.1 MPa through a beads-packed layer in which spherical beads made of zirconia (YTZ ball, diameter 0.1 mm: manufactured by Nikkato Co., Ltd.) had been packed with a diameter of 60 mm and a layer thickness of 100 mm, and the fine magnesium oxide particle dispersion liquid that had passed the beads-packed layer was collected by a container for collecting the dispersion liquid. For the collected fine magnesium oxide particle dispersion liquid, the particle size distribution, magnesium oxide concentration and transmittance were measured. The results are shown in Table 1.

Comparative Example 1

A magnesium oxide particle dispersion liquid was produced in a similar method to that of Example 1, except that the magnesium oxide particle dispersion liquid prepared in Example 1 was not passed through the beads-packed layer. For the collected magnesium oxide particle dispersion liquid, the particle size distribution, magnesium oxide concentration and transmittance were measured. The results are shown in Table 1.

Example 2

30 g of a fine magnesium oxide powder (BET specific surface area: 170 m$^2$/g, average particle diameter: 10 nm), 258 g of dichloromethane, 12 g of a dispersant (a surfactant, Plysurf M208F: manufactured by DKS Co., Ltd.) and 1.2 kg of spherical beads made of zirconia (YTZ ball, diameter: 0.1 mm: manufactured by Nikkato Co., Ltd.) were put into a container having a volume of 1 L, and the container was closed with a lid. The container closed with the lid was then shaken at 520 rpm for 3 hours by using a rocking mill to thereby prepare a magnesium oxide particle dispersion liquid. The magnesium oxide particle dispersion liquid in the container was collected by decantation.

160 g of the collected magnesium oxide particle dispersion liquid was passed through a beads-packed layer in which spherical beads made of zirconia (YTZ ball, diameter 0.1 mm: manufactured by Nikkato Co., Ltd.) had been packed with a diameter of 60 mm and a layer thickness of 100 mm under pressurization at 0.1 MPa, and the fine magnesium oxide particle dispersion liquid that had passed the beads-packed layer was collected by a container for collecting the dispersion liquid. For the collected fine magnesium oxide particle dispersion liquid, the particle size distribution, magnesium oxide concentration and transmittance were measured. The results are shown in Table 1.

Comparative Example 2

A magnesium oxide particle dispersion liquid was produced in a similar method to that of Example 2, except that the magnesium oxide particle dispersion liquid prepared in Example 2 was not passed through the beads-packed layer. For the collected magnesium oxide particle dispersion liquid, the particle size distribution, magnesium oxide concentration and transmittance were measured. The results are shown in Table 1.

Comparative Example 3

30 g of a fine magnesium oxide powder (BET specific surface area: 170 m$^2$/g, average particle diameter: 10 nm), 270 g of methanol, and 1.2 kg of spherical beads made of zirconia (YTZ ball, diameter: 0.1 mm: manufactured by Nikkato Co., Ltd.) were put into a container having a volume of 1 L, and the container was closed with a lid. The container closed with the lid was then shaken at 520 rpm for 3 hours by using a rocking mill to thereby prepare a magnesium oxide particle dispersion liquid. The magnesium oxide particle dispersion liquid in the container was collected by decantation.

160 g of the collected magnesium oxide particle dispersion liquid was passed under pressurization at 0.1 MPa through a beads-packed layer in which spherical beads made of zirconia (YTZ ball, diameter 0.1 mm: manufactured by Nikkato Co., Ltd.) had been packed with a diameter of 60 mm and a layer thickness of 100 mm, and the fine magnesium oxide particle dispersion liquid that had passed the beads-packed layer was collected by a container for collecting the dispersion liquid. For the collected magnesium oxide particle dispersion liquid, the particle size distribution, magnesium oxide concentration and transmittance were measured. The results are shown in Table 1.

Comparative Example 4

A magnesium oxide particle dispersion liquid was produced in a similar method to that of Comparative Example 3, except that the magnesium oxide particle dispersion liquid prepared in Comparative Example 3 was not passed through the beads-packed layer. For the collected fine magnesium oxide particle dispersion liquid, the particle size distribution, magnesium oxide concentration and transmittance were measured. The results are shown in Table 1.

TABLE 1

| | $D_{50}$ (nm) | $D_{95}$ (nm) | 200 nm or more (%) | 500 nm or more (%) | MgO concentration (%) | Transmittance (%) |
|---|---|---|---|---|---|---|
| Example 1 | 42.5 | 54.0 | Undetected | Undetected | 9.9 | 74.6 |
| Comparative Example 1 | 43.6 | 121.2 | 3.94 | 2.75 | 10.0 | 66.0 |
| Example 2 | 27.2 | 52.1 | Undetected | Undetected | 10.9 | 78.0 |
| Comparative Example 2 | 28.4 | 406.8 | 7.39 | 3.23 | 10.8 | 62.6 |
| Comparative Example 3 | 41.5 | 121.8 | 2.78 | Undetected | 10.6 | 67.7 |
| Comparative Example 4 | 53.2 | 352.0 | 20.14 | 2.24 | 10.6 | 21.2 |

It is understood from the above-mentioned results that the fine magnesium oxide particle dispersion liquids that has been passed through the packed layer of spherical beads made of zirconia (Examples 1 and 2) show smaller values of $D_{50}$, $D_{95}$, the content rate of the particles having particle diameters of 200 nm or more and the content rate of the coarse particles having particle diameters of 500 nm or more, as compared to the magnesium oxide particle dispersion liquids before passing through the packed layer of spherical beads made of zirconia (Comparative Examples 1 and 2). Specifically, it is understood that the coarse particles had been removed from the fine magnesium oxide particle dispersion liquids that had been passed through the packed layer of spherical beads made of zirconia (Examples 1 and 2) to a level such that coarse particles of 500 nm or more were not able to be detected. Furthermore, it is also understood that fine magnesium oxide particle dispersion liquids each having a higher transmittance were obtained, as compared to Comparative Examples 3 and 4 in which methanol (a protic solvent) was used as the solvent.

Example 3

30 g of a fine magnesium oxide powder (BET specific surface area: 170 $m^2/g$, average particle diameter: 10 nm), 258 g of 2-butanone, 12 g of a dispersant (a surfactant, Plysurf A208F: manufactured by DKS Co., Ltd.) and 1.2 kg of spherical beads made of zirconia (YTZ ball, diameter: 0.1 mm: manufactured by Nikkato Co., Ltd.) were put into a container having a volume of 1 L, and the container was closed with a lid. The container closed with the lid was then shaken at 520 rpm for 3 hours by using a rocking mill to thereby prepare a magnesium oxide particle dispersion liquid. The magnesium oxide particle dispersion liquid in the container was collected by decantation.

160 g of the collected magnesium oxide particle dispersion liquid was passed under pressurization at 0.1 MPa through a beads-packed layer in which spherical beads made of zirconia (YTZ ball, diameter 0.1 mm: manufactured by Nikkato Co., Ltd.) had been packed with a diameter of 60 mm and a layer thickness of 100 mm, and the fine magnesium oxide particle dispersion liquid that had passed the beads-packed layer was collected by a container for collecting the dispersion liquid. For the collected fine magnesium oxide particle dispersion liquid, the particle size distribution and magnesium oxide concentration were measured. The results are shown in Table 2.

Furthermore, 6 g of the collected fine magnesium oxide particle dispersion liquid was collected and put into a glass vial with a volume of 9 mL (LABORAN screw tube vial No. 3), put into a thermo-hygrostat that had been preset to 20° C., 90% RH under a state without a lid for 2 hours, and taken out. When the dispersion liquid that had been taken out of the thermo-hygrostat was observed, there was no specific change.

Comparative Example 5

A magnesium oxide particle dispersion liquid was produced in a similar method to that of Example 3, except that the magnesium oxide particle dispersion liquid prepared in Example 3 was not passed through the beads-packed layer. For the collected magnesium oxide particle dispersion liquid, the particle size distribution, magnesium oxide concentration and transmittance were measured. The results are shown in Table 2.

Example 4

The magnesium oxide particle dispersion liquid of Example 4 was produced in a similar method to that of Example 3, except that 258 g of ethyl acetate was used as the aprotic solvent. For the collected magnesium oxide particle dispersion liquid, the particle size distribution and magnesium oxide concentration were measured in a similar manner to that of Example 3. The results are shown in Table 2. Furthermore, when a stability test was conducted in a similar manner to Example 3 by putting the dispersion liquid into a thermo-hygrostat, there was no specific change as in Example 3.

Comparative Example 6

A magnesium oxide particle dispersion liquid was produced in a similar method to that of Example 4, except that the magnesium oxide particle dispersion liquid prepared in Example 4 was not passed through the beads-packed layer. For the collected magnesium oxide particle dispersion liquid, the particle size distribution, magnesium oxide concentration and transmittance were measured. The results are shown in Table 2.

Example 5

The magnesium oxide particle dispersion liquid of Example 5 was produced in a similar method to that of Example 3, except that 255 g of N-methylpyrrolidone was used as the aprotic solvent, and that 15 g of a surfactant Plysurf A219B (manufactured by DKS Co., Ltd.) was used as the dispersant. For the collected magnesium oxide particle dispersion liquid, the particle size distribution and magnesium oxide concentration were measured in a similar manner to that of Example 3. The results are shown in Table 2. Furthermore, when a stability test was conducted in a similar manner to Example 3 by putting the dispersion liquid into a thermo-hygrostat, there was no specific change as in Example 3.

Comparative Example 7

A magnesium oxide particle dispersion liquid was produced in a similar method to that of Example 5, except that the magnesium oxide particle dispersion liquid prepared in Example 5 was not passed through the beads-packed layer. For the collected magnesium oxide particle dispersion liquid, the particle size distribution, magnesium oxide concentration and transmittance were measured. The results are shown in Table 2.

Example 6

The magnesium oxide particle dispersion liquid of Example 5 was produced in a similar method to that of Example 3, except that 234 g of cyclohexane was used as the aprotic solvent, and that 36 g of a surfactant Plysurf A208F (manufactured by DKS Co., Ltd.) was used as the dispersant. For the collected magnesium oxide particle dispersion liquid, the particle size distribution and magnesium oxide concentration were measured in a similar manner to that of Example 3. The results are shown in Table 2. Furthermore, when a stability test was conducted in a similar manner to Example 3 by putting the dispersion liquid into a thermo-hygrostat, there was no specific change as in Example 3.

Comparative Example 8

A magnesium oxide particle dispersion liquid was produced in a similar method to that of Example 6, except that the magnesium oxide particle dispersion liquid prepared in Example 6 was not passed through the beads-packed layer. For the collected magnesium oxide particle dispersion liquid, the particle size distribution, magnesium oxide concentration and transmittance were measured. The results are shown in Table 2.

Comparative Example 9

The magnesium oxide particle dispersion liquid of Comparative Example 9 was produced in a similar method to that of Example 3, except that 270 g of methanol was used as the aprotic solvent, and that a dispersant was not used. For the collected magnesium oxide particle dispersion liquid, the particle size distribution and magnesium oxide concentration were measured in a similar manner to that of Example 3. The results are shown in Table 2. Furthermore, when a stability test was conducted in a similar manner to Example 3 by putting the dispersion liquid into a thermo-hygrostat, unlike Example 3, the fluidity was lost, and the dispersion liquid turned into a gel state.

TABLE 2

| | $D_{50}$ (nm) | $D_{95}$ (nm) | 200 nm or more (%) | 500 nm or more (%) | MgO concentration (%) | Transmittance (%) |
|---|---|---|---|---|---|---|
| Example 3 | 32.5 | 64.9 | Undetected | Undetected | 10.2 | 79.4 |
| Comparative Example 5 | 33.6 | 287.6 | 7.19 | 1.66 | 10.3 | 58.0 |
| Example 4 | 33.3 | 57.6 | Undetected | Undetected | 10.2 | 52.9 |
| Comparative Example 6 | 33.8 | 82.6 | 2.13 | 1.47 | 10.2 | 47.5 |
| Example 5 | 97.1 | 201.0 | 5.13 | Undetected | 9.8 | 85.5 |
| Comparative Example 7 | 101.8 | 341.8 | 15.60 | 2.51 | 10.0 | 64.9 |
| Example 6 | 55.7 | 91.4 | Undetected | Undetected | 10.0 | 82.9 |
| Comparative Example 8 | 61.5 | 929.2 | 18.98 | 16.15 | 10.1 | 36.2 |
| Comparative Example 9 | 41.5 | 121.8 | 2.78 | Undetected | 10.6 | 67.7 |

The invention claimed is:

1. A fine magnesium oxide particle dispersion liquid comprising an aprotic solvent, and fine magnesium oxide particles that are dispersed in the aprotic solvent,
the dispersion liquid having $D_{50}$ of 200 nm or less in a particle size distribution on a light intensity basis as measured by a dynamic light scattering method, and having a content rate of coarse particles having an average particle diameter of 500 nm or more of less than 1%.

2. The fine magnesium oxide particle dispersion liquid according to claim 1, which has $D_{95}$ of from 20 to 100 nm in the particle size distribution as measured by a dynamic light scattering method.

3. A method for producing a fine magnesium oxide particle dispersion liquid of claim 1, comprising:
a dispersion step, in which fine magnesium oxide particles and a dispersant are dispersed in an aprotic solvent to give a dispersion liquid containing coarse particles, and
a filtration step, in which the dispersion liquid containing coarse particles is passed through a packed layer in which beads are packed.

4. The method for producing a fine magnesium oxide particle dispersion liquid according to claim 3, wherein the dispersion step is conducted by a pulverizing apparatus using beads.

5. The method for producing a fine magnesium oxide particle dispersion liquid according to claim 3, wherein the filtration step is conducted under pressurization.

6. The method for producing a fine magnesium oxide particle dispersion liquid according to claim 4, wherein the filtration step is conducted under pressurization.

7. The fine magnesium oxide particle dispersion liquid according to claim 1, the dispersion liquid having $D_{50}$ of 5 to 100 nm.

8. The fine magnesium oxide particle dispersion liquid according to claim 1, the dispersion liquid having $D_{50}$ of 10 to 60 nm.

9. The fine magnesium oxide particle dispersion liquid according to claim 1, the content rate of the coarse particles having an average particle diameter of 500 nm or more is 0.8% or less.

10. The fine magnesium oxide particle dispersion liquid according to claim 1, the content rate of the coarse particles having an average particle diameter of 500 nm or more is 0.5% or less.

11. The fine magnesium oxide particle dispersion liquid according to claim 1, the content rate of the coarse particles having an average particle diameter of 200 nm or more is 1% or less.

12. The fine magnesium oxide particle dispersion liquid according to claim 1, the content rate of the coarse particles having an average particle diameter of 200 nm or more is 0.8% or less.

13. The fine magnesium oxide particle dispersion liquid according to claim 1, the content rate of the coarse particles having an average particle diameter of 200 nm or more is 0.5% or less.

14. The fine magnesium oxide particle dispersion liquid according to claim 1, wherein the liquid has a transmittance of 70% or more.

15. The fine magnesium oxide particle dispersion liquid according to claim 1, wherein the liquid has a transmittance of 75% or more.

* * * * *